United States Patent [19]
Jennings et al.

[11] Patent Number: 5,215,006
[45] Date of Patent: Jun. 1, 1993

[54] TWINE CLAMP FOR ROUND BALER TWINE WRAPPING APPARATUS

[75] Inventors: Richard E. Jennings, Manheim; Fred M. Horchler, Jr., Lancaster, both of Pa.

[73] Assignee: Ford New Holland, Inc., New Holland, Pa.

[21] Appl. No.: 848,486

[22] Filed: Mar. 9, 1992

[51] Int. Cl.⁵ .................................................. B65B 13/18
[52] U.S. Cl. .......................................... 100/5; 56/341; 100/13; 242/149
[58] Field of Search ............. 100/5, 13, 88, 89; 56/341, 343; 242/149

[56] References Cited

U.S. PATENT DOCUMENTS

| | | | |
|---|---|---|---|
| 2,627,223 | 2/1953 | Berge | 100/13 |
| 3,910,178 | 10/1975 | Eggers et al. | 100/5 |
| 4,062,279 | 12/1977 | Grube et al. | 100/5 |
| 4,182,235 | 1/1980 | Harig | 100/5 X |
| 4,282,804 | 8/1981 | Cools | 100/5 |
| 4,457,226 | 7/1984 | Meiers | 100/13 X |
| 4,502,646 | 3/1985 | Meiers | 242/149 |
| 4,557,189 | 12/1985 | Schaible | 100/5 X |
| 4,619,193 | 10/1986 | Crew | 100/13 |
| 4,800,811 | 1/1989 | Wellman | 100/5 |

Primary Examiner—Stephen F. Gerrity
Attorney, Agent, or Firm—Frank A. Seemar; Larry W. Miller

[57] ABSTRACT

Twine wrapping apparatus for a round baler having a bale forming chamber with a generally transverse crop infeed opening. The apparatus is mounted forward of the opening and includes a twine arm for dispensing twine into the chamber to wrap bales formed therein. Coupling means provide for swinging movement of the arm through a predetermined path during at least a portion of which the arm dispenses twine in the vicinity of the opening. The twine arm includes a clamp having one member affixed to the outer end of the twine arm and a second member that is moveable relative to the first member and is urged thereagainst to provide a clamping force for holding the twine.

7 Claims, 6 Drawing Sheets

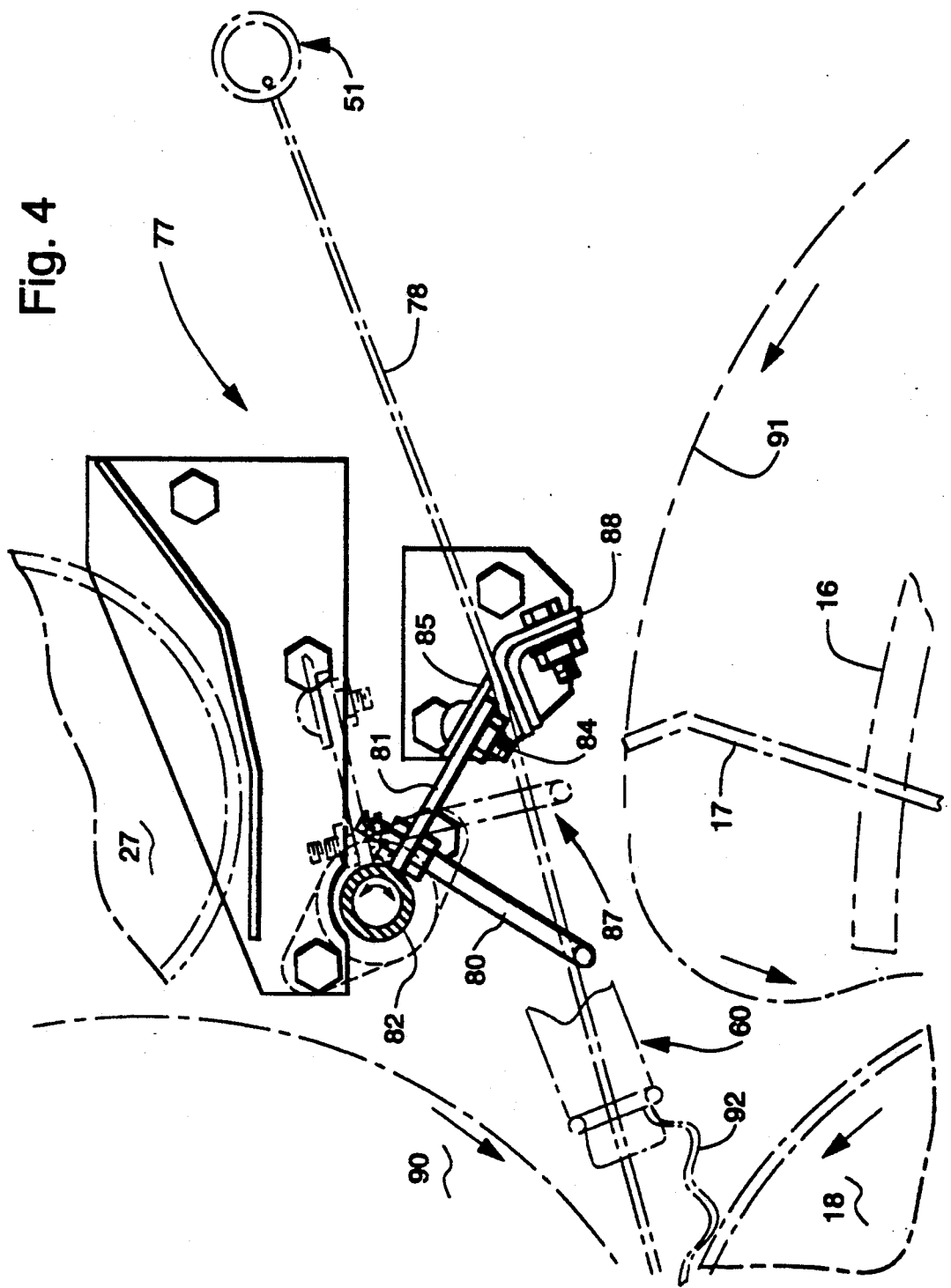

TWINE CLAMP FOR ROUND BALER TWINE WRAPPING APPARATUS

BACKGROUND OF THE INVENTION

This invention relates generally to a baler for forming cylindrical bales of crop material, commonly referred to as a round baler. More particularly, this invention is directed to an improved twine arm for round baler twine wrapping apparatus.

Balers of this type have a bale forming chamber defined by an apron comprising an array of belts, chains, and/or rolls within which the cylindrical bale is formed. Crop material such as hay is picked up from the ground as the baler traverses the field and is then fed into the chamber where it is rolled up to form a compact cylindrical bale. Twine wrapping apparatus is provided for securing the bale in its compacted form while still inside the bale forming chamber prior to ejecting the bale from the chamber onto the ground for subsequent handling. Wrapping apparatus commonly utilizes one or more twine dispensing arms for feeding twine to the circumference of the formed bale. Lateral traversal of the arm or arms results in a helical wrap around the bale as the bale is turned in the chamber.

There are various prior art approaches for wrapping twine around round bales to maintain its compact integrity when ejected. In most or all of these it is important that the initial free end of the twine strand, commonly referred to as the "tail", is consistently of sufficient length to assure that the wrapping operation is immediately and properly carried out. To accomplish this the twine is sometimes clamped after it has been severed at the completion of the previous wrapping operation. Clamping mechanisms are commonly utilized in the wrapping apparatus and in some instances are mounted on the twine arm to prevent loss or shortening of the tail due to slack in the system when the twine is cut.

Also of concern in twine wrapping apparatus is convenience of initially threading twine in a new baler or rethreading the twine when the supply becomes depleted. The twine is stored in balls located on the baler in compartments from which the twine is fed out to the wrapping apparatus. It is then guided along a path to the twine tube and ultimately to its dispensing end. During twine threading, as the lead end is drawn along its path from the storage compartment to and then through the wrapping apparatus, if clamps are employed they must be disengaged to permit threading and then reengaged to permit normal operation. When twine is pulled during wrapping from the dispensing tube which is fed, via the twine path, from the supply, it should not be unduly impeded by the clamp or clamps disposed along its path.

If tensioning of the twine is desired, which in many instances is variably applied, it could be an independent function of the clamps. Usually some kind of tensioning device is provided to apply tension to the twine as it is being wrapped around the bale to improve bale compactness and stability. If such tensioning causes hesitation in the grasping of the tail, wrapping start is delayed and baler reliability is affected. Thus, controllably tensioning and tail length are important interrelated aspects of reliable round bale wrapping.

SUMMARY OF THE INVENTION

An important object of the present invention is to provide improved twine wrapping apparatus for a round baler which enhances the serviceability and functionality without affecting reliability of the baler.

In pursuance of this and other important objects the present invention provides for new and unique twine wrapping apparatus for a round baler having a bale forming chamber, a crop infeed opening in the chamber, a twine handling assembly mounted in the vicinity of the infeed opening for dispensing twine through opening for wrapping a round bale formed in the chamber. The said twine handling assembly includes an improved arm having an outwardly disposed twine dispensing end for dispensing twine and means for swinging the arm to move the twine dispensing end across the infeed opening as twine is being dispensed.

According to broadest aspect of the invention, apparatus of the type above is provided wherein the improved twine dispensing end includes a clamp comprising a first member affixed to the outer end of the arm, a second member moveable relative to the first member, and resilient means for urging the second member against the first member at a predetermined clamping force against the twine therebetween.

More specifically, the preferred embodiment of the invention contemplates improved twine wrapping apparatus for a round baler having a bale forming chamber, a generally transverse opening in the chamber, a twine handling assembly mounted in the vicinity of the opening for dispensing twine therethrough, the twine handling assembly including an arm having an outwardly disposed twine dispensing end for dispensing twine and the twine handling assembly further includes means for swinging the twine dispensing end across the opening as twine is being dispensed. The arm has first and second members and the twine dispensing end is disposed on the second member. Means are provided for coupling the second member to the first member for reciprocation relative thereto between extended and retracted positions and the improvement comprising the twine dispensing end includes a clamp for clamping twine therebetween at a predetermined clamping force that is sufficient to hold the twine when the second member reciprocates.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 4 is a view taken in the direction of arrows 4—4 in FIG. 3 and shows a phantom outline of a bale and various elements of the round baler.

DESCRIPTION OF THE PREFERRED EMBODIMENT

Figure 1:
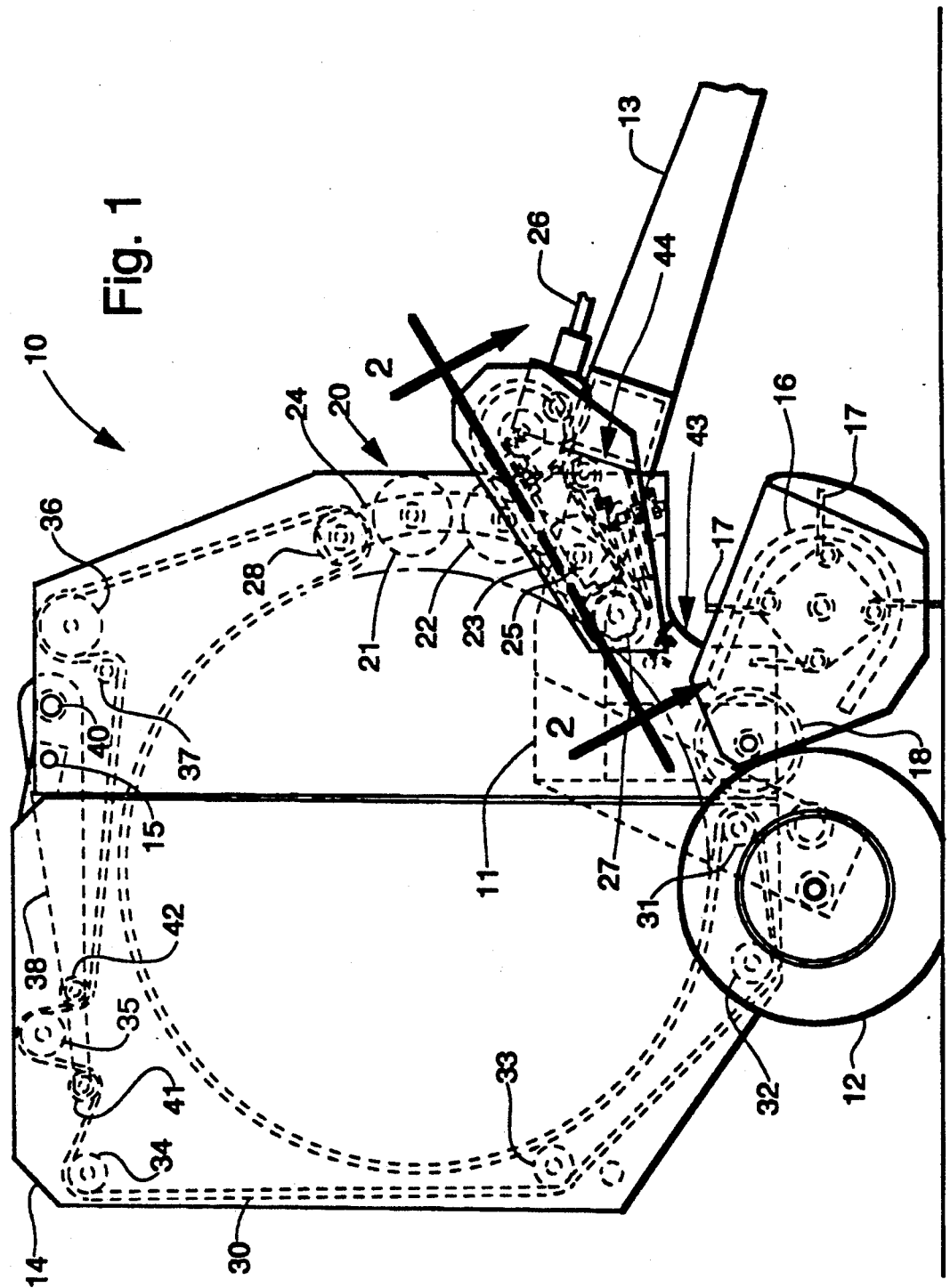
FIG. 1 is a side elevational view of a round baler in which the present invention is embodied.

Referring now to the drawings for a more detailed description of the preferred embodiment of the invention, FIG. 1 shows an expandable chamber round baler 10 of the type disclosed in detail in U.S. Pat. No. 4,956,968 issued on Sep. 18, 1990. It includes a main frame 11 supported by a pair of wheels 12 (only one shown), a tongue 13 on the forward portion of main frame 11 for connection to a tractor and a tailgate 14 pivotally connected to main frame 11 by stub shafts 15 so that tailgate 14 may be closed as shown in FIG. 1 during bale formation and wrapping or opened to discharge a completed bale. A conventional pickup 16 is mounted on main frame 11 and is commonly supported by a pair of wheels (not shown).

Pickup 16 includes a plurality of fingers or tines 17 movable along a predetermined path to lift crop material from the ground and deliver it toward a floor roll 18 which is rotatably mounted on main frame 11.

The baler depicted in FIG. 1 shows a sledge assembly 20 having a plurality of rollers 21, 22, 23 extending transversely of main frame 11 in an arcuate array common to the type baler described in U.S. Pat. No. 4,956,968, mentioned above.

Rollers 21, 22, 23 are journalled at the ends thereof in a pair of spaced apart arms 24 (only one shown) pivotally mounted inside main frame 11 on stub shafts 25 for permitting pivotal movement of the sledge between a bale starting position (shown in U.S. Pat. No. 4,956,968) and the full bale position shown in FIG. 1. Rollers 21, 22, 23 are driven in a counter clockwise direction (as viewed in FIG. 1) by conventional means, for example, chains and sprockets or gears, connected with a drive shaft 26 which is adapted for coupling to a PTO (power take off) of a tractor (not shown). A starter roll 27 is located adjacent roller 23 and is also driven in a counter clockwise direction to strip crop material from roller 23. A freely rotatable idler roller 28 is also mounted on arms 24 for movement with sledge assembly 20.

A conventional apron, generally referred to by reference numeral 30, includes a plurality of continuous flat side by side belts supported by guide rolls 31, 32, 33, 34, 35, rotatably mounted in tailgate 14. Apron 30 is also supported on a drive roll 36 rotatably mounted on main frame 11. Although apron 30 passes between roller 21 and idler roller 28, it is in engagement with only idler roller 28 while roller 21 is located in close proximity to apron 30 to strip crop material from its belts (referred to above). Further conventional means (not shown) are connected with drive shaft 26 to provide rotation of drive roll 36 in a direction causing movement of apron 30 along the path indicated in broken lines in FIG. 1. An additional guide roll 37 in main frame 11 ensures proper driving engagement between apron 30 and drive roll 36. A pair of take up arms 38 (one shown) are pivotally mounted on main frame 11 by a cross shaft 40 for movement between varying inner and fixed outer positions, corresponding to bale forming and full bale conditions, respectively. The full bale position shown in FIG. 1 will suffice for the proposes of the description of this invention. Further, it should be noted that take up arms 38 carry additional guide rolls 41,42 for supporting apron 30. Resilient means (not shown) are provided to normally urge take up arms 38 toward their inner positions while resisting movement thereof from their inner positions to their outer positions to keep tension on the roll forming belts in a known manner.

As baler 10 is towed across a field by a tractor, pick up tines 17 lift crop material from the ground and deliver it into the bale forming chamber through the transverse infeed opening, commonly referred to as the throat 43, which in the baler shown is defined by floor roll 18 and starter roll 27. The crop material fed through throat 43 is continuously coiled in a clockwise direction until the inner courses of apron 30 expand to the position shown in FIG. 1. This bale formation takes place in a well known manner, after which wrapping takes place (described below), tailgate 14 is opened, the wrapped bale is discharged rearwardly in a conventional manner, tail gate 14 is closed and the round baler is again ready to form another bale.

Now turning to the twine wrapping apparatus of the present invention which in its preferred embodiment is adapted to the structure of the above described round baler, it should be noted that it is not intended that its use be limited to balers of this nature. Further it is not intended that its use be limited to multiple twine arm apparatus or telescopic twine arms, but that it is contemplated that the present invention is adaptable for use on many if not all current round balers using single or multiple twine arm wrapping apparatus. Additionally, it will become apparent in the description that follows, that even though the invention is particularly adaptable to telescopic twine arms, the invention is not so limited.

Figure 2:
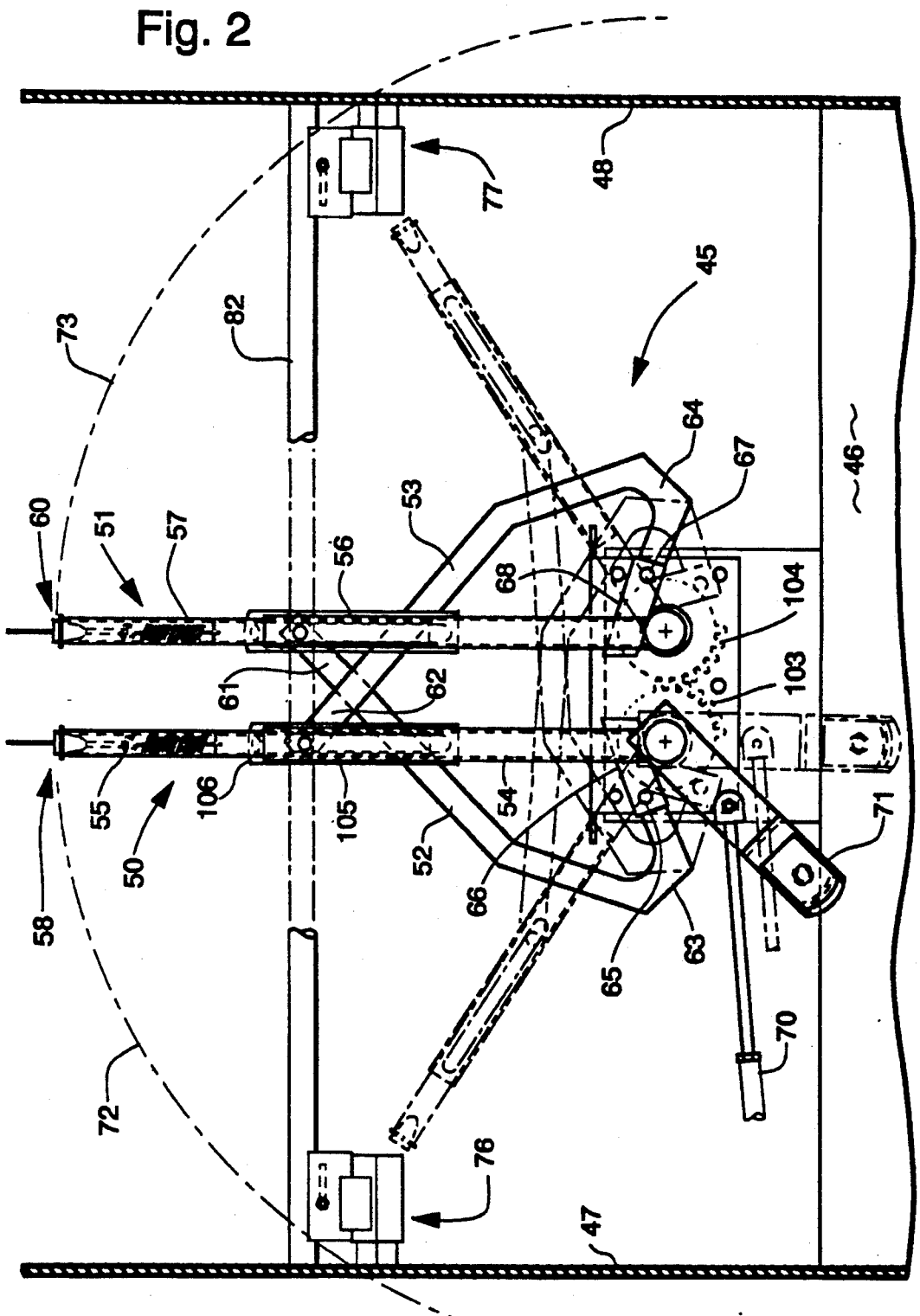
FIG. 2 is a view taken in the direction of arrows 2—2 in FIG. 1 and shows the improved twine arm of the present invention.

The wrapping apparatus 44 shown in FIG. 1 is best described by referring first to FIG. 2 where the twine handling assembly, generally referred to by reference numeral 45, is shown mounted on a frame member 46 between sidewalls 47, 48. The assembly includes a pair of twine arms 50, 51 shown in their rearmost extended position and coupled together by first and second link members 52, 53. Each twine arm comprises first and second members 54, 55 and 56, 57, the second members each being telescopically mounted within each corresponding first member, and twine dispensing ends 58, 60 at the outer ends of the second members. The link members each have outer ends 61, 62 and inner ends 63, 64 whereby the outer end of each is pivotally coupled to the second member of one of the twine arms and the inner end is attached to the first member of the other twine arm. More specifically, first link member 52 comprises outer end 61 and inner end 63, the inner end of which is pivotally connected, via a pivot pin 65, to a rigid strap 66, which in turn is affixed to first member 54 of twine arm 50. Likewise, second link member 53 comprises outer end 62 and inner end 64, the inner end of which is pivotally connected, via pivot pin 67, to rigid strap 68, which in turn is affixed to first member 56 of twine arm 51.

Twine arm 50 is driven in a counter clockwise direction and twine arm 51 is driven in a clockwise direction when the drive arm 70 urges the driven link 71 to the position shown in phantom outline. Due to the twine arm coupling arrangement shown in the wrapping apparatus on which the preferred embodiment of this invention is disclosed, the twine arms rotate to the phantom position shown with the second member of each arm retracting within the first member of each arm. The normal path of the twine arms in the fully extended position (without the coupling in place) would be along the arcuate paths 72 and 73. Now turning to FIG. 3, the twine wrapping apparatus is shown in solid lines to be in the same position as in FIG. 2 but in the phantom outline the twine arms are shown in their fully rotated position. The predetermined curved paths 74 and 75 describe the actual path along which the outer ends of the twine arms travel and the importance of the shape of these paths will become apparent as the twine guide assemblies 76, 77 of this embodiment are described.

Figure 3:
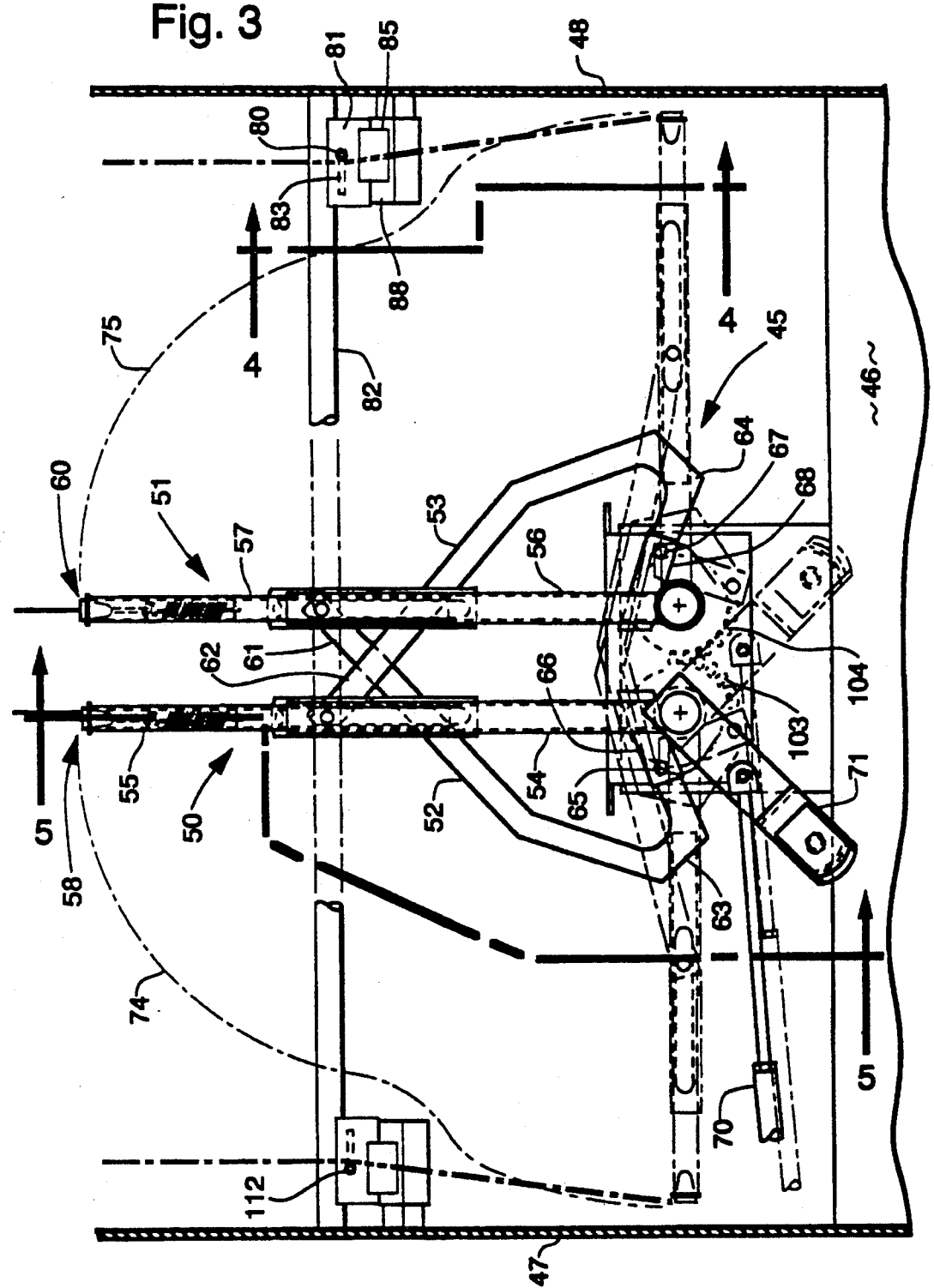
FIG. 3 is a view taken in the same direction as FIG. 2 and shows a phantom outline of the improved twine arm in a different retracted position than is shown in FIG. 2.

In FIG. 4 twine guide assembly 77 (shown generally in FIGS. 2 and 3) is shown in relationship to twine 78, shown in phantom to illustrate the path during engagement with guide pin 80. Pin mounting plate 81, affixed to rotatable shaft 82, provides a slot 83 (see FIGS. 2 & 3) along which pin 80 is adjusted and has a knife 85 attached thereto by bolt 84. During wrapping pin 80 is disposed in the phantom position 87 for guiding twine as shown in FIG. 3. When the twine arms reach the fully rotated positions shaft 82 rotates plate 81 to the position shown in full lines whereby knife 85 engages the twine against striker plate 88 to provide severing of the twine leaving a tail portion having a length corresponding to the distance between twine tube 51 (shown in phantom) and knife 85.

FIG. 4 also shows various components of the baler in phantom for illustrative purposes to assist in the below description of the operation. A fully formed round bale, generally designated by reference numeral 90, is shown in relationship to floor roll 18, pickup tine 17, the path 91 of tines 17, stripper roll 27 and twine dispensing end 60 in its fully extended center position with a twine tail 92 extending loosely therefrom.

Figure 6:
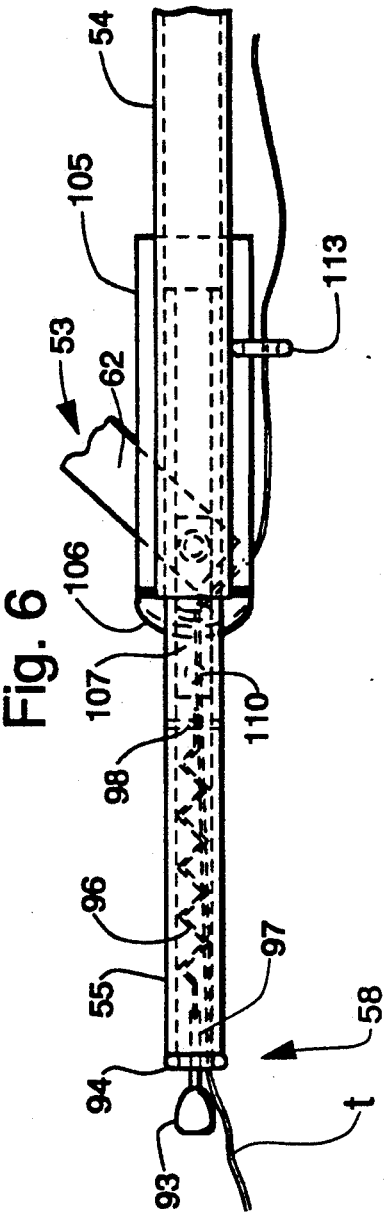
FIG. 6 is a view taken in the direction of arrows 6—6 in FIG. 5.
Figure 5:
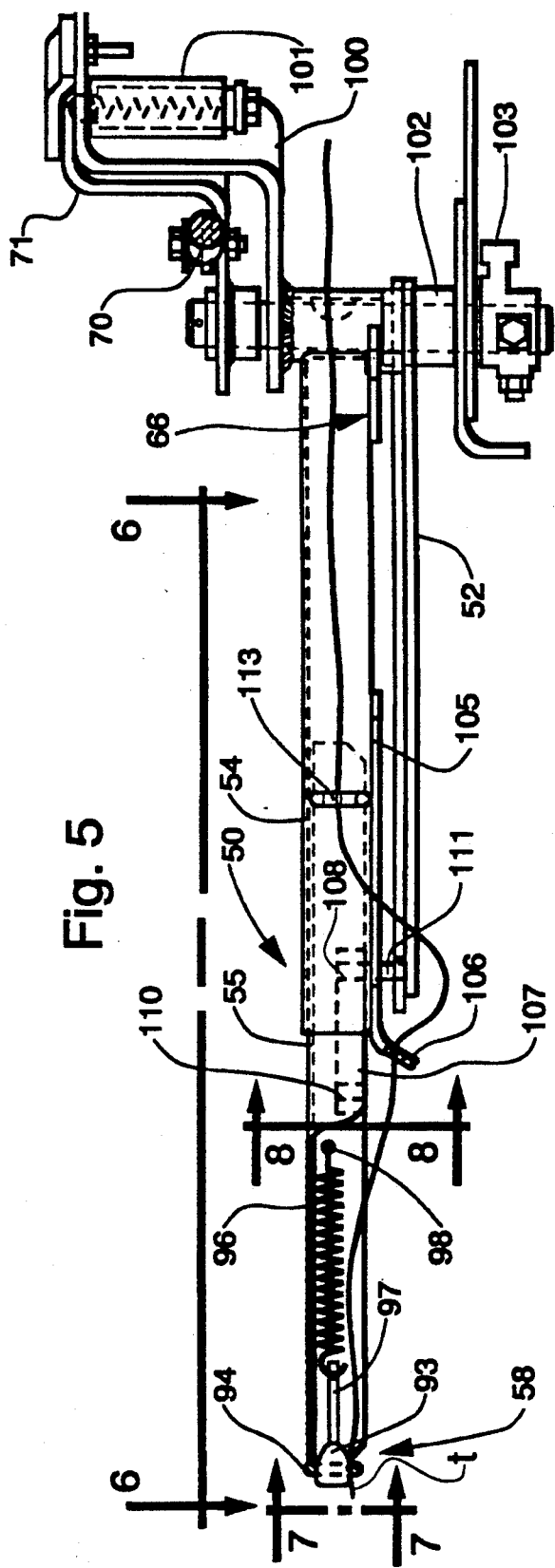
FIG. 5 is a view taken in the direction of arrows 5—5 in FIG. 3.

Referring to the areas of the baler in which the present invention is embodied, twine arm 50, shown in fully extended position in FIG. 5, includes a clamp comprising spool 93, generally conical shaped, secured in a nesting fashion within a ring 94 affixed to the end of twine arm member 55. Spool 93 is urged in a general axial direction along arm 50 into engagement with the inner surface of ring 94 by a spring 96 stretched between tab 97 (extending from spool 93) and anchor 98 attached to the inner surface of twine arm member 55. Spool 93 pulled axially by the force of spring 96 provides a clamping function by holding the portion of the twine, designated by the reference letter "t", between the outer surface of spool 93 and the inner surface of ring 94, i.e., in the vicinity from which it emerges from the twine dispensing end 58. FIG. 6 shows clamping spool 93 in the extended position which is accomplished by manually pulling the spool 93 away from the end of twine arm 50 by overcoming the spring force provided by spring 96. This extended position of spool 93 permits initial threading of twine through ring 94, the importance of which will be described in further detail below.

The drive arrangement for twine arm 50 includes a drive lever 100 that is driven with driven link 71 by drive arm 70 via an intermediate break away arrangement 101 that operates in a well known manner. Drive lever 100 is secured to a sleeve 102 as is first twine arm member 54. Thus, when drive arm 70 rotates driven link 71 and drive lever 100 twine arm 50 attached to sleeve 102 is rotated therewith. The other twine arm 51 is also rotated in concert with twine arm 50 via drive gear 103 which meshes with driven gear 104 (FIG. 2). As twine arms 50 and 51 are rotated in this manner the outer portions thereof (members 55 and 57) are telescopically retracted through a unique interrelated coupling system that is now to be described.

Figure 7:
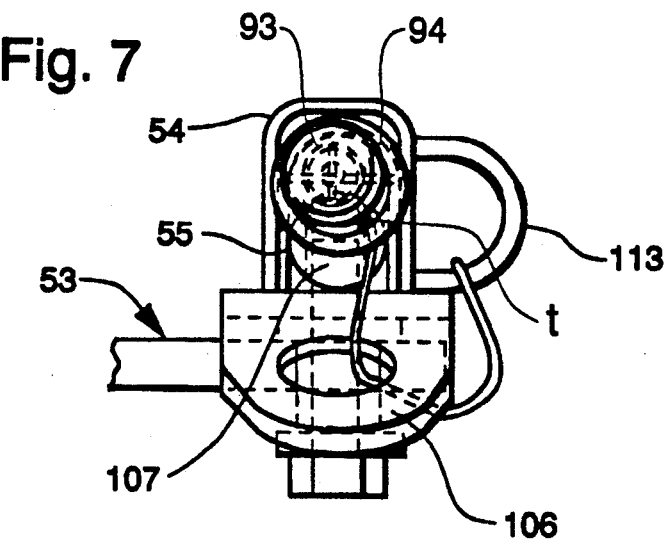
FIG. 7 is a view taken in the direction of arrows 7—7 in FIG. 5.
Figure 8:
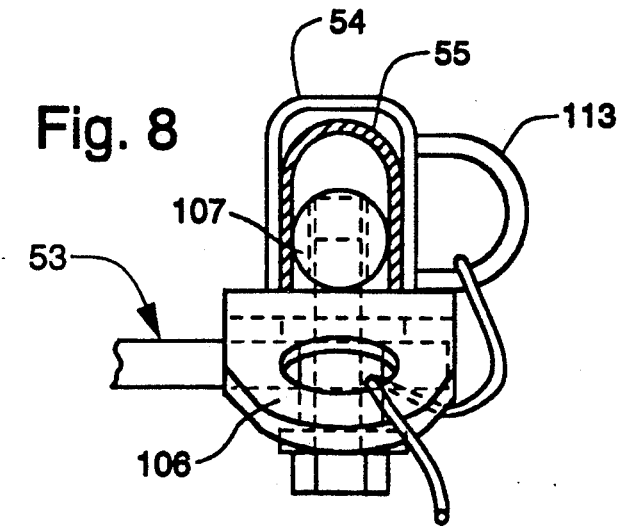
FIG. 8 is a view taken in the direction of arrows 8—8 in FIG. 5.

First member 54 of twine arm 50, secured to sleeve 102, is generally U shaped in cross section (FIGS. 7 and 8) and includes a base member 105 (see FIG. 5) secured to the outer bottom portion thereof, which base has a downwardly inclined flange 106 with a twine guide aperture. The second twine arm member 55 is also U-shaped in cross section and fits for sliding engagement within first arm member 54 (see FIG. 8). Secured to second arm member 55 is pivot mounting block 107 (circular in cross section) having two bores 108, 110 for receiving link pivot pin 111 in bore 108 (as shown in FIG. 5) or bore 110 to shorten the twine arm. Also secured to first member 54 and moveable therewith is rigid strap 66 (a similar strap 68 is secured to member 56) to which the inner first end 63 of first link member 52 is attached via pivot pin 65. Again, a similar pivot pin 67 links strap 68 to second link member 53.

When twine arms 50 and 51 are rotated by drive arm 70 in counter clockwise and clockwise directions, respectively, the coupling between them, comprising first and second link members 52 and 53, changes the overall length of the arms by retracting in concert the second members telescopically within the first members. During this rotation the twine dispensing ends of the twine arms travel along predetermined curved paths 74 and 75 the configuration of which is determined by the shape and relationship of links 52 and 53. More particularly, it should be noted that the paths avoid twine guide assemblies 76, 77. The twine arms begin in a fully extended position, fully retract to avoid guide assemblies 76, 77 and then partially extend again to position the twine dispensing ends of twine arms 50, 51 adjacent side walls 47, 48.

The twine wrapping apparatus described herein is nonoperative during bale formation. After a bale has been formed in the bale forming chamber the twine arm leaves its rest position which is shown in phantom in FIG. 3. At that point the twine has been severed and a tail of desired length is extending loosely from the twine dispensing tip is clamped in place by clamping spool 93. The twine arm then swings to the fully extended position shown in FIGS. 2 & 3 and place the tail, which has maintained its original predetermined length, on floor roll 18 which is rotating in a counterclockwise direction (FIG. 4). Floor roll 18 normally has an aggressive surface and that in conjunction with its rotation assures that the twine tail 92 (providing it is of sufficient length) will be fed to the nip between bale 90 and the floor roll 18, and fed around the formed bale by overcoming the tension force of the clamp and pulling the twine from the dispensing tube. The tension force can be varied by varying the location of anchor 98 or changing the spring. The full extension of the twine arm permits the dispensing tip to start dispensing twine from the position shown in phantom in FIG. 4. At that point the twine is continuously pulled from the twine tube to dispense transversely in a known manner, i.e., the swinging motion of the tube guides the twine along a lateral path as it proceeds to feed out twine for spirally wrapping the bale being rotated in the bale chamber.

As the twine tip continues along its curved path the twine extends rearwardly from the tube to the bale along a path in a direction generally parallel to the adjacent side wall. The twine eventually comes in contact with the guide pin to prevent twine wraps from being applied on the outermost portion of the cylindrical surface of the bale, which again is a well known expedient in the round baler art.

An important aspect of the present invention is the convenient location of the twine clamp on the end of the twine tube for reliable twine tail length. The twine cannot back up in the tube. Further, in the telescopic arm embodiment the clamp assures that the tail length will be maintained during extension of the tube prior to wrapping. Even if the tail exists during retraction of the arm the tail integrity is maintained. These aspects along with the unique structure of the clamp greatly improve any baler on which this invention is used.

Included in the many advantages, explicit and implicit, of the novel apparatus of the present invention and equally as important as the above mentioned advantages is the capability to provide a round baler with a twine wrapper apparatus that is easily serviced. When twine is initially threaded (or rethreaded when the supply is depleted) from the twine balls and thence along convenient guides to the tube, it is fed out manually until it reaches the vicinity of the twine arms. Referring to FIG. 5, the twine is then fed through a readily accessible twine guide loop 113 and then through the aperture in flange 106 affixed to arm member 54. The central location of this aperture serves to maintain the twine in the center and below the U-shaped twine arm members 54 and 55. The end of the twine is then fed through the twine clamp by manually extending spool 93 to the position shown in FIG. 6. After a sufficient amount of the end section of the twine is threaded between spool 93 and end ring 94, spool 93 is released and permitted to nest in ring 94 in the clamping position shown in FIG. 5. The ready access of this twine path serves to simplify the threading function of the wrapping apparatus as does the simple, reliable and novel clamp and ring structure.

Thus a reliable, readily serviceable round baler twine wrapper with a wide range of adaptability is provided without affecting the operational and functional aspects of the machine.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. Improved twine wrapping apparatus for a round baler comprising a bale forming chamber, a generally transverse opening in said chamber, a twine handling assembly mounted in the vicinity of said opening for dispensing twine through said opening for wrapping a round bale formed in said chamber, said twine handling assembly including an arm having an outwardly disposed twine dispensing end for dispensing twine, said twine handling assembly further including means for swinging said arm to move said twine dispensing end across said opening as twine is being dispensed, the improvement wherein
said twine dispensing end includes a clamp comprising a ring shaped first member affixed to said outer end of said arm, a second member moveable relative to said first member, said second member nests with said first member over a continuous surface on said first member, and resilient means for urging said second member against said first member to clamp twine therebetween at a predetermined clamping force.

2. In twine wrapping apparatus as set forth in claim 1 wherein said second member is generally conical shaped and is urged axially along said arm against continuous surface of said first member.

3. In twine wrapping apparatus as set forth in claim 1 wherein said means for swinging include drive means for moving said twine dispensing end along a predetermined path in the vicinity of said opening to dispense twine via said clamping mechanism under conditions where said clamping force is overcome during round bale wrapping.

4. Improved twine wrapping apparatus for a round baler comprising a bale forming chamber, a generally transverse opening in said chamber, a twine handling assembly mounted in the vicinity of said opening for dispensing twine therethrough, said twine handling assembly including an arm having an outwardly disposed twine dispensing end for dispensing twine, said twine handling assembly further including means for swinging said arm to move said twine dispensing end across said opening as twine is being dispensed, said arm having first and second members, said twine dispensing end being disposed on said second member, and said twine handling assembly including means for coupling said second member to said first member for reciprocation relative thereto between extended and retracted positions, the improvement comprising
said twine dispensing end includes a clamp for clamping twine therebetween at a predetermined clamping force, said force being sufficient to hold the twine when said second member reciprocates from said retracted position to said extended position.

5. In twine wrapping apparatus as set forth in claim 4 wherein said means for swinging comprise drive means operatively associated with said coupling means for reciprocating said second member between said extended and retracted positions, said second member extending toward said opening in said extended position to dispense twine from said twine dispensing end in the vicinity of said opening.

6. In twine wrapping apparatus as set forth in claim 5 wherein said second member of said twine arm is telescopically mounted within said first member of said twine arm.

7. In twine wrapping apparatus as set forth in claim 4 wherein said twine handling assembly includes a pivot for pivotally mounting said first member, and
said means for swinging moves said twine arm about said pivot from said retracted position of said second member to said extended position.

* * * * *